United States Patent Office 3,472,810
Patented Oct. 14, 1969

3,472,810
POLYARYLENE POLYETHER COMPOSITION
Alastair C. Gowan, Pittsfield, Mass., assignor to General Electric Company, a corporation of New York
No Drawing. Filed Mar. 28, 1966, Ser. No. 537,659
Int. Cl. C08g 43/02, 51/28
U.S. Cl. 260—33.6                              6 Claims

ABSTRACT OF THE DISCLOSURE

A polymer composition comprising a major portion of a polyarylene polyether and a minor portion of a polyolefin and preferably, a minor portion of mineral oil. The polyolefin decreases the hot processing temperature of the polyarylene polyether. The mineral oil improves the compatibility of the polyarylene polyether with the polyolefin.

---

This invention relates to a polyarylene polyether composition having improved solvent and impact resistance and low temperature processability. More particularly, this invention relates to a composition containing a major portion of a polymer which is the reaction product of a bisphenol and a dihalogenated diphenylsulphone and a minor portion of a polyolefin.

The polyarylene polyethers are a class of linear thermoplastics that are described and claimed in published Netherlands patent application Ser. No. 6,408,130 filed July 16, 1964, the contents of which are incorporated herein by reference. They are attributed with low cost, toughness, solvent resistance, low temperature processability and high temperature resistance. It has now been unexpectedly found, however, that the solvent and impact resistance and the processability of those polyarylene polyethers which are the reaction products of a bisphenol and a dihalogenated diphenylsulphone can be substantially improved by the addition of a minor portion of a polyolefin thereto.

Accordingly an object of this invention is to provide a polyarylene polyether composition having increased solvent and impact resistance and low temperature processability, said composition comprising a major portion of a polymer which is the reaction product of a bisphenol and a dihalogenated diphenylsulphone and a minor portion of a polyolefin.

Other objects and advantages of this invention will be in part apparent and in part pointed out in the description which follows.

The process for forming the polyarylene polyethers according to the above noted Netherlands patent application comprises the reaction of a double alkali metal salt of a dihydric phenol with a dihalogen benzenoid compound having an inert electron attracting group in at least one of the positions ortho or para to the halogen atom under nonaqueous conditions in an inert, strongly polar organic solvent. No catalyst is necessary for the reaction. The products of the reaction can be represented by the formula:

(I)             —O—E—O—E¹ wherein E is the residue of the dihydric phenol and E¹ is the residue of the benzenoid compound having the inert electron attracting group in at least one position which stands ortho or para to the valence bond.

If the dihydric phenol contains strong electron attracting groups, products with low molecular weight or impractically slow reaction speeds are obtained. For that reason, the preferred dihydric phenols are weakly acid dinuclear phenols and preferably bisphenols.

The dihalogen benzenoid compounds (E¹ of the above formula) may be either mononuclear or polynuclear as long as the activating electron attracting group is present in the ortho or para position of the benzenoid nucleus. When the dihalogen benzenoid compound is mononuclear, both halogen atoms are attached to the same benzenoid ring. When polynuclear, they are bonded to different benzenoid rings. Any halogen may be substituted on the benzenoid ring though fluorine and chlorine are preferred.

Any electron attracting group may be used as the activating group on the dihalogen benzenoid compound. The sulphone group is the preferred electron activating group because it is a strong electron activating group. However, either monovalent or bivalent electron attracting groups may be used. Typical examples of said groups may be found in the above cited Netherlands patent application.

In accordance with the present invention, it has been found that for the polyarylene polyethers which are the reaction products of a bisphenol and a dihalogenated diphenylsulphone, the solvent and impact resistance can be increased and the processing temperature decreased by the addition of a polyolefin to the polyarylene polyether. The bisphenol for purposes of the present invention is one which corresponds to the following general formula.

(II)

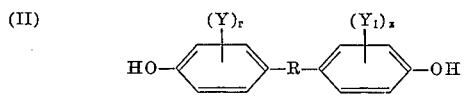

wherein R represents a divalent alkyl group having from 1 to 3 carbon atoms, Y and $Y_1$ represent the same or different inert substituents such as alkyl having from 1–3 carbon atoms, halogen, etc., and $r$ and $z$ are whole numbers with a value of 0 to 4.

The dihalogen diphenylsulphone reactive with the bisphenol may be represented by the formula (III)

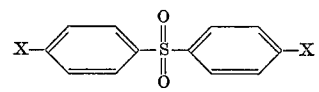

wherein X represents a halogen, and preferably chlorine or fluorine.

The reaction of these two materials to form a polyarylene polyether take place in accordance with the description supra and the teachings of the above noted Netherlands patent applications.

The polyarylene polyether resulting from the reaction of the bisphenol and the dihalogenated diphenylsulphone may be represented by the following formula.

(IV)

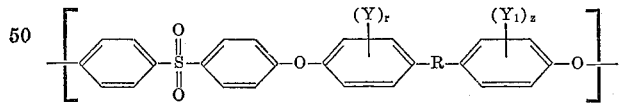

wherein R, Y, $Y_1$, $r$ and $z$ have the meaning noted above.

For brevity, those polymers corresponding to Formula IV above will be referred to as the "polysulphones."

The term "polyolefin" appearing in the present specification and claims is used to denote normally solid homopolymers of alpha monoolefinically unsaturated hydrocarbons as well as copolymers, thereof, with one or more organic compounds copolymerizable therewith which contain polymer producing unsaturation, such as is present in compounds containing the ethylene linkage >C=C<, e.g. styrene, vinyl stearate, butene, vinyl acetate, vinyl formate, methyl acrylate, monobutyl maleate, 2-ethyl hexyl acrylate, N-methyl-N-vinyl acetamide, acrylic acid, isoprene, butadiene, bicycloheptene and the like. Many other copolymerizable monomers which can be used in addition to these illustrative compounds are well known in the art.

The manner of mixing the polyolefin with the polysulfone is not critical, and does not constitute a part of this invention. The dispersing operation may be carried out by any means known to those skilled in the art provided a homogeneous finely divided mixture results. For example, the dispersing operation may be carried out by mixing the two polymers in powdered form in a mixer such as a Banbury mixer, Waring Blendor and/or roll mills. Thereafter, the mixture may be molded or extruded. An additional method for forming the alloy consists of dissolving each polymer in a solvent to form a solution. The polymers are then recovered from solution as an alloy.

In a preferred embodiment of this invention, a plasticizer is mixed with the blend of polyolefin and polysulfone. Use of a plasticizer causes a dissolving or swelling of both polymeric components and thereby enhances mixing. This prevents preferential association of regions of the same polymer and subsequent delamination. Generally any plasticizer which is compatible with both the polyolefin and polysulfone may be used. Typical examples of suitable plasticizers include materials such as chlorinated bisphenols, low molecular weight polyphenylene ethers, mineral oil, etc. In general, mineral oil is the preferred plasticizer and may be used in amounts up to 5% by weight of the total composition and preferably in an amount of from 1 to 2% by weight of the total composition.

The amount of polyolefin that may be added to the polysulfone is that amount which is compatible with the polysulfone. In general, it has been found that polyolefins can be added to the polysulfone in amounts up to 10%, by weight, of the total composition when a plasticizer is used. Above 10%, the polyolefin is no longer soluble in the polysulfone and there is a tendency for molded samples to delaminate. This causes severe weakening of the sample resulting in an article having undesirable properties. Particularly good results are obtained when the polyolefin addition ranges between 0.5–5% by weight and this constitutes a preferred embodiment of this invention. There is no lower limit to the amount of polyolefin that may be added to the polysulfone, but the properties of the mixture are not noticeably affected when the polyolefin content is less than 0.5%, by weight, of the total composition.

It has been found that increases in impact strength in excess of 55% are obtained when 3% polyethylene is blended with a polysulfone. In addition, increases in resistance to aggressive solvents of up to 175% have been found with additions of only 1% polyethylene. With the same composition, molding temperatures have decreased by as much as 40° F.

The following examples are illustrative of the process of this invention and the improved properties obtainable thereby, but are not to be construed as limiting in any way. All percentages expressed in the examples are by weight unless indicated otherwise.

EXAMPLE 1

In this example, the polysulfone used was the reaction product of bisphenol A and a dihalogenated diphenylsulfone corresponding to Formula III supra. The polyolefin was a polyethylene. Polysulfone samples containing 0, 0.5, 1.0, 3.0, 5.0 and 10.0% polyethylene respectively were formulated. The polysulfone used was ground to a powder that passed a 30 mesh screen, and the polyethylene was a powdered grade having an average particle size of less than 20 microns. The resins were initially blended by dry tumbling the powders in the required proportions for a minimum of thirty minutes. Thereafter, the blends were extruded using a three-quarter inch Wayne extruder. Extrusion temperature was maintained between approximately 500° F. and 550° F. Following extrusion, the samples were pelletized using a strand chopper and injection molded at a temperature ranging between 500 and 540° F. to form a series of test bars measuring 2½ x ½ x ⅛ inches. Both the impact strength and time to crack in a 75/25% acetone/methanol solution with 3% applied strain were measured. The impact strength was determined pursuant to the standard set forth by ASTM-D-250. This test is a measure of the energy required to break a notch test bar by means of a hammer. Thus, this test is an indication of the shock resistance of a material. A brittle or notchsensitive material has a low impact strength.

The resistance to an aggressive solvent was measured by bending the test bars until a 3% elongation occurred on the outer surface of the strained test bar. The test bars were locked in a 4 point loading jig and immersed in the aggressive solvent. The time necessary for these strained bars to crack on the strained surface was measured. The results obtained from the above two tests are set forth in Table I below.

TABLE I.—PROPERTIES OF POLYSULFONE-POLYETHYLENE ALLOY

| Composition, wt. percent | | Molding temp., ° F. | Izod impact, ft.-lb/in., notch | Time to crack (sec.) |
| --- | --- | --- | --- | --- |
| Polysulfone | Polyethylene | | | |
| 100 | 0 | 540 | 1.22 | 43 |
| 99.5 | 0.5 | 530 | 1.30 | 45 |
| 99.0 | 1.0 | 520 | 1.30 | 123 |
| 97.0 | 3.0 | 500 | 1.90 | 98 |
| 95.0 | 5.0 | 500 | 1.70 | 51 |
| 90.0 | 10.0 | 500 | 1.90 | -------- |

From the above table, it can be seen that Izod impact strength increases and passes through a maximum with increasing concentration of polyethylene. This maximum is reached at approximately the 3.0% polyethylene level. The sample containing the 5% polyethylene showed signs of delamination and this is the cause of the decrease in the crack time.

EXAMPLE 2

Following the procedure of Example 1, a second series of alloys were prepared containing 0, 1.0, 3.0 and 5.0 polypropylene. The polysulfone used was the same as in Example 1. The solvent used to determine stress cracking properties was a 3/1 by volume acetone-methanol mixture. The following results were obtained.

TABLE II.—PROPERTIES OF POLYSULFONE-POLYPROPYLENE ALLOY

| Composition, wt. percent | | Izod impact strength, ft.-lb./inch notch | Time to crack, sec. |
| --- | --- | --- | --- |
| Polysulfone | Polypropylene | | |
| 100.0 | 0.0 | 1.2 | 43 |
| 99.0 | 1.0 | 1.3 | 138 |
| 97.0 | 3.0 | 1.6 | 66 |
| 95.0 | 5.0 | 1.6 | 14 |

Signs of delamination were present in the sample containing 5.0% polypropylene and this accounts for the short cracking time for this sample. In all other respects the results were similar to those of the previous example.

EXAMPLE 3

In this example, a sample was prepared containing 100 parts by weight of the polysulfone of Example 1, 3 parts polypropylene and 2 parts mineral oil as a plasticizer. Impact strength was found to be 1.7 ft.-lb. per inch notch and time to crack in a 3/1 acetone/methanol mixture was 42 seconds.

Although preferred embodiments of this invention have been described in detail, it is contemplated that modifications of the invention may be made that are within the scope and intent of the invention as defined by the appended claims.

I claim:
1. A polymeric composition having improved impact and solvent resistance and low temperature processability consisting of

(1) from 90–99.5% by weight of a polyarylene polyether corresponding to the following general formula:

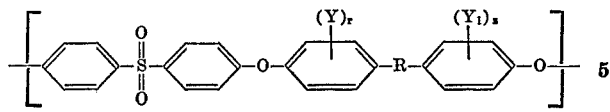

wherein R represents a divalent alkyl group having from 1–3 carbon atoms; Y and $Y_1$ are members selected from the group consisting of hydrogen, hydrocarbon having from 1–3 carbon atoms and halogen; and $r$ and $z$ represent whole numbers with a value of 0 to 4, and (2) from 0.5 to 10% by weight of a polyolefin.

2. The composition of claim 1 wherein the polyolefin constitutes from 0.5–5.0% of the total composition.

3. The composition of claim 1 including up to 5% by weight liquid mineral oil.

4. The composition of claim 3 wherein the polyolefin is polyethylene.

5. The composition of claim 3 wherein the polyolefin is polypropylene.

6. The composition of claim 3 including from 1–2%, by weight, mineral oil.

References Cited

UNITED STATES PATENTS 3,297,784   1/1967   Snedacker   260—47
3,361,851   1/1968   Gowan   260—33.4

FOREIGN PATENTS 6,408,130   1/1965   Netherlands.

OTHER REFERENCES

Renfrew, Polythene: The Technology and Uses of Ethylene Polymers, Interscience Publishers, Inc., 1960, pp. 378, 382, 383.

MORRIS LIEBMAN, Primary Examiner

L. T. JACOBS, Assistant Examiner

U.S. Cl. X.R.

260—897